(12) United States Patent
Humfeld et al.

(10) Patent No.: US 10,641,891 B2
(45) Date of Patent: May 5, 2020

(54) SOLAR ENABLED AERIAL DEPLOYED RADIO ANTENNA SYSTEM

(71) Applicant: The Boeing Company, Chicago, IL (US)

(72) Inventors: Keith Daniel Humfeld, Federal Way, WA (US); Matthew Kyle Fay, Wentzville, MO (US)

(73) Assignee: The Boeing Company, Chicago, IL (US)

( * ) Notice: Subject to any disclaimer, the term of this patent is extended or adjusted under 35 U.S.C. 154(b) by 219 days.

(21) Appl. No.: 16/006,352

(22) Filed: Jun. 12, 2018

(65) Prior Publication Data

US 2019/0379107 A1 Dec. 12, 2019

(51) Int. Cl.

| H01Q 1/30 | (2006.01) |
|---|---|
| H01Q 15/16 | (2006.01) |
| G01S 13/89 | (2006.01) |
| H02S 10/40 | (2014.01) |
| H02S 30/20 | (2014.01) |
| B64C 39/02 | (2006.01) |
| B64D 3/00 | (2006.01) |
| B64D 27/24 | (2006.01) |
| H02S 40/34 | (2014.01) |

(52) U.S. Cl.
CPC ............ *G01S 13/89* (2013.01); *B64C 39/022* (2013.01); *B64D 3/00* (2013.01); *B64D 27/24* (2013.01); *H01Q 1/30* (2013.01); *H01Q 15/16* (2013.01); *H01Q 15/161* (2013.01); *H02S 10/40* (2014.12); *H02S 30/20* (2014.12); *H02S 40/34* (2014.12)

(58) Field of Classification Search
CPC ........ H01Q 1/30; H01Q 15/161; H01Q 15/16; G01S 13/89; H02S 10/40; H02S 30/20; H02S 40/34; B64C 39/022; B64D 3/00; B64D 27/24
See application file for complete search history.

(56) References Cited

U.S. PATENT DOCUMENTS

| 3,160,879 | A | 12/1964 | Downing et al. |
|---|---|---|---|
| 5,231,480 | A | 7/1993 | Ulich |
| 7,900,866 | B2 | 3/2011 | Kutzmann et al. |
| 2003/0068981 | A1 | 4/2003 | Duthie |
| 2013/0062464 | A1 | 3/2013 | Speer |
| 2017/0024854 | A1 | 1/2017 | Humfeld |

*Primary Examiner* — Matthew M Barker
(74) *Attorney, Agent, or Firm* — Armstrong Teasdale LLP

(57) ABSTRACT

An aerial deployed radio antenna system includes a primary aerial vehicle and a plurality of secondary aerial vehicles coupled to the primary aerial vehicle with a primary tether, wherein the plurality of secondary aerial vehicles are coupled to each other with a plurality of secondary tethers. The system also includes a radar-reflective sheet suspended between and supported by a plurality of cables coupled to the plurality of secondary aerial vehicles, wherein the radar-reflective sheet forms a parabolic reflector shape when deployed and towed by the primary aerial vehicle. A radar transmitter/receiver is positioned relative to the radar-reflective sheet to transmit radar signals toward the radar-reflective sheet and receive radar signals focused by the radar-reflective sheet, and a plurality of solar cells is positioned on the radar-reflective sheet. The plurality of solar cells are electrically coupled to a power collector configured to supply solar-generated electrical power to the radar transmitter/receiver.

20 Claims, 5 Drawing Sheets

SOLAR ENABLED AERIAL DEPLOYED RADIO ANTENNA SYSTEM

FIELD

This invention relates generally to airborne radio antenna systems, and more particularly, to a solar enabled deployable airborne sensor array system and method of use.

BACKGROUND

This invention relates generally to airborne radio antenna systems, and more particularly, to a solar enabled deployable airborne sensor array system and method of use.

At least some known high sensitivity radar system require large antennas to provide a large area over which signals can be collected. Conventionally, such large antennas are ground-based and require a rigid, heavy support structure. Additionally, at least some high power radar systems have thermal management issues due to the proximity of the high power electronics to other system components.

At least some known air surveillance and reconnaissance systems use an aerial vehicle coupled to a tether. The tether restricts the flight space, so that a fly-away will not occur. The aerial vehicle may include a sensor for surveillance or other data gathering relating to a target. However, such aerial systems typically include relatively small antennae, which limit the range of such systems. Additionally, the towing vehicle and sensor vehicle both require power and so the mission duration of such systems is limited by the amount of power stored on the vehicles.

BRIEF DESCRIPTION

In one aspect, an aerial deployed radio antenna system is provided. The aerial deployed radio antenna system includes a primary aerial vehicle and a plurality of secondary aerial vehicles coupled to the primary aerial vehicle with a primary tether, wherein the plurality of secondary aerial vehicles are coupled to each other with a plurality of secondary tethers. The system also includes a radar-reflective sheet suspended between and supported by a plurality of cables coupled to the plurality of secondary aerial vehicles, wherein the radar-reflective sheet forms a parabolic reflector shape when deployed and towed by the primary aerial vehicle. A radar transmitter/receiver is positioned relative to the radar-reflective sheet to transmit radar signals toward the radar-reflective sheet and receive radar signals focused by the radar-reflective sheet, and a plurality of solar cells is positioned on the radar-reflective sheet. The plurality of solar cells are electrically coupled to a power collector configured to supply solar-generated electrical power to the radar transmitter/receiver.

In another aspect, a method of assembling an aerial deployed radio antenna system is provided. The method includes coupling a primary tether to a primary aerial vehicle and to at least one of a plurality of secondary aerial vehicles and coupling the plurality of secondary aerial vehicles together with a plurality of secondary tethers. The method also includes suspending a radar-reflective sheet between the plurality of secondary aerial vehicles with a plurality of cables, wherein the radar-reflective sheet forms a parabolic reflector shape when deployed and towed by the primary aerial vehicle. A radar transmitter/receiver is positioned relative to the radar-reflective sheet to transmit radar signals toward the radar-reflective sheet and receive radar signals focused by the radar-reflective sheet. The method further includes coupling a plurality of solar cells to the radar-reflective sheet, where the plurality of solar cells are electrically coupled to a power collector configured to supply solar-generated electrical power to the radar transmitter/receiver.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The implementations described herein relate to an aerial deployed system and method that is capable of supplying solar-generated power to components for long range and high sensitivity radar imaging. More specifically, the system described herein includes a primary aerial vehicle and a plurality of secondary aerial vehicles coupled to the primary aerial vehicle with an electrically conductive primary tether. The plurality of secondary aerial vehicles are coupled to each other with a plurality of electrically conductive secondary tethers. The system also includes a radar-reflective sheet suspended between and supported by a plurality of cables coupled between the plurality of secondary aerial vehicles and the radar-reflective sheet. Wen deployed, the secondary aerial vehicles diverge from each other such that the radar-reflective sheet forms a parabolic reflector shape when towed by the primary aerial vehicle. A radar transmitter/receiver is positioned relative to the radar-reflective sheet to transmit radar signals toward the radar-reflective sheet and receive radar signals focused by the radar-reflective sheet. A plurality of solar cells are positioned on the radar-reflective sheet and are electrically coupled to a power collector configured to supply solar-generated electrical power to the radar transmitter/receiver. Furthermore, the power collector supplies the primary aerial vehicle with solar generated power to enable persistent sustained flight of the primary aerial vehicle.

As such, the system described herein may be used to supply solar-generated electrical power collected by solar cells on a radar-reflective sheet to radar imaging equipment and to a towing vehicle. Such a self-powered system allows for radar imaging missions that are longer in duration and able to image contested areas. Furthermore the system described herein may be used to improve the range and sensitivity of the radar imaging equipment by using a larger than conventional radar-reflective sheet towed at a high altitude and by operating the radar imaging equipment at comparatively higher power levels enabled by cooling the radar imaging equipment with the passing airstream.

Figure 1:
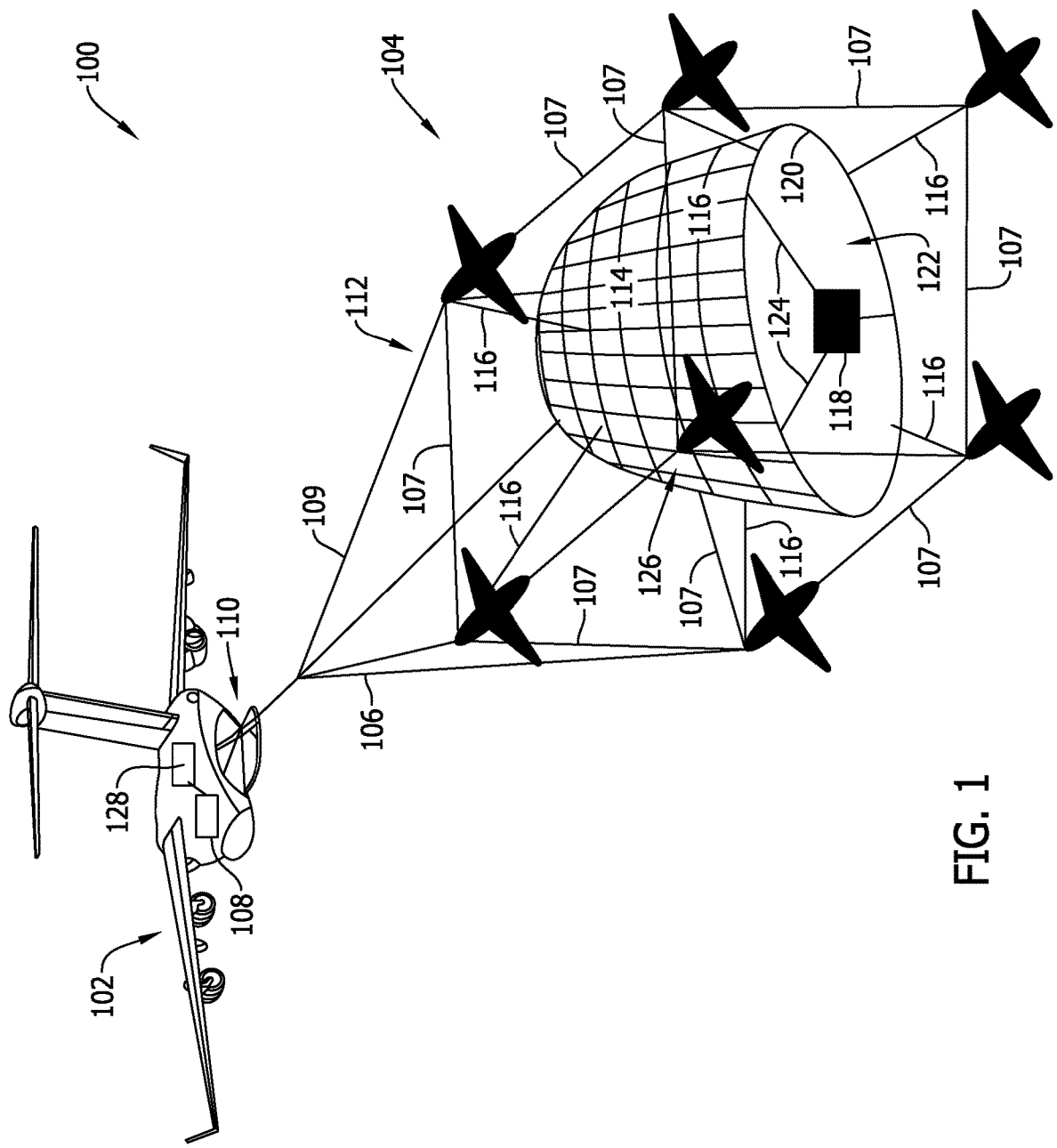
FIG. 1 is a perspective view of an exemplary deployable airborne radio antenna system.

FIG. 1 is a perspective view of an exemplary aerial deployed radio antenna system 100. In the exemplary implementation, aerial deployed radio antenna system 100 includes a primary aerial vehicle 102 configured to deploy and tow a plurality of secondary airborne vehicles 104 coupled to primary aerial vehicle 102 via a flexible primary tether 106. Aerial deployed radio antenna system 100 also includes a controller 108 coupled in communication with primary aerial vehicle 102 and each secondary airborne vehicle 104.

In the exemplary implementation, primary tether 106 includes a first end 110 coupled to primary aerial vehicle 102, and a second end 112 extending outward behind primary aerial vehicle 102 at coupled to at least one secondary aerial vehicle 104. Primary aerial vehicle 102 includes a tether management system (not shown) or other securing means for retaining and controlling the amount of primary tether 106 released. The tether management system may be, for example, a winch or any other mechanical device that is capable of pulling in, letting out, or otherwise adjusting the tension/length of primary tether 106.

In the exemplary implementation, aerial deployed radio antenna system 100 also includes a radar-reflective sheet 114 coupled to secondary aerial vehicles 104. More specifically, radar-reflective sheet 114 is suspended between and supported by a plurality of cables 116 coupled to and between radar-reflective sheet 114 and secondary aerial vehicles 104. A radar transmitter/receiver 118 is positioned relative to radar-reflective sheet 114 to transmit radar signals toward radar-reflective sheet 114 and receive radar signals focused by the radar-reflective sheet 114, as described herein. More specifically, radar-reflective sheet 114 includes a ring-shaped cable 120 that defines an open end 122 of radar-reflective sheet 114 when aerial deployed radio antenna system 100 is deployed. A plurality of support cables 124 are coupled between ring-shaped cable 120 and radar transmitter/receiver 118 such that radar transmitter/receiver 118 is positioned within open end 122 of radar-reflective sheet 114. Specifically, radar transmitter/receiver 118 is positioned such that radar transmitter/receiver 118 is at least partially exposed to the air stream to facilitate cooling radar transmitter/receiver 118. More specifically, in one embodiment, radar-reflective sheet 114 is at least partially porous to enable an airflow therethrough to facilitate cooling radar transmitter/receiver 118. Exposing radar transmitter/receiver 118 to the cooling air stream enables radar transmitter/receiver 118 to operate at higher power levels that generate greater amounts of heat compared to land-based transmitters/receivers.

As described herein, radar transmitter/receiver 118 transmits radar signals toward radar-reflective sheet 114 and receives radar signals focused by the radar-reflective sheet 114. The radar data collected by radar transmitter/receiver 118 is transmitted in real time to controller 108. The radar data may also be transmitted to an end user for viewing or to a computer-implemented database where the radar data may be stored. The end user may be located at, for example, primary aerial vehicle 102, a ground station (not shown), or at a remote location where access is provided via a network (e.g., the Internet). The radar data transmission may be wireless or wired. When a wired communication link is employed, it may be accomplished via conductors embedded in primary tether 106.

In the exemplary implementation, controller 108 may be located at, for example, primary aerial vehicle 102, a ground station (not shown), or at a remote location where access is provided via a network (e.g., the Internet). Controller 108 is configured to receive and process the radar data received from radar transmitter/receiver 118, and generate information of the target area based on the radar data, as described in more detail herein.

Figure 2:
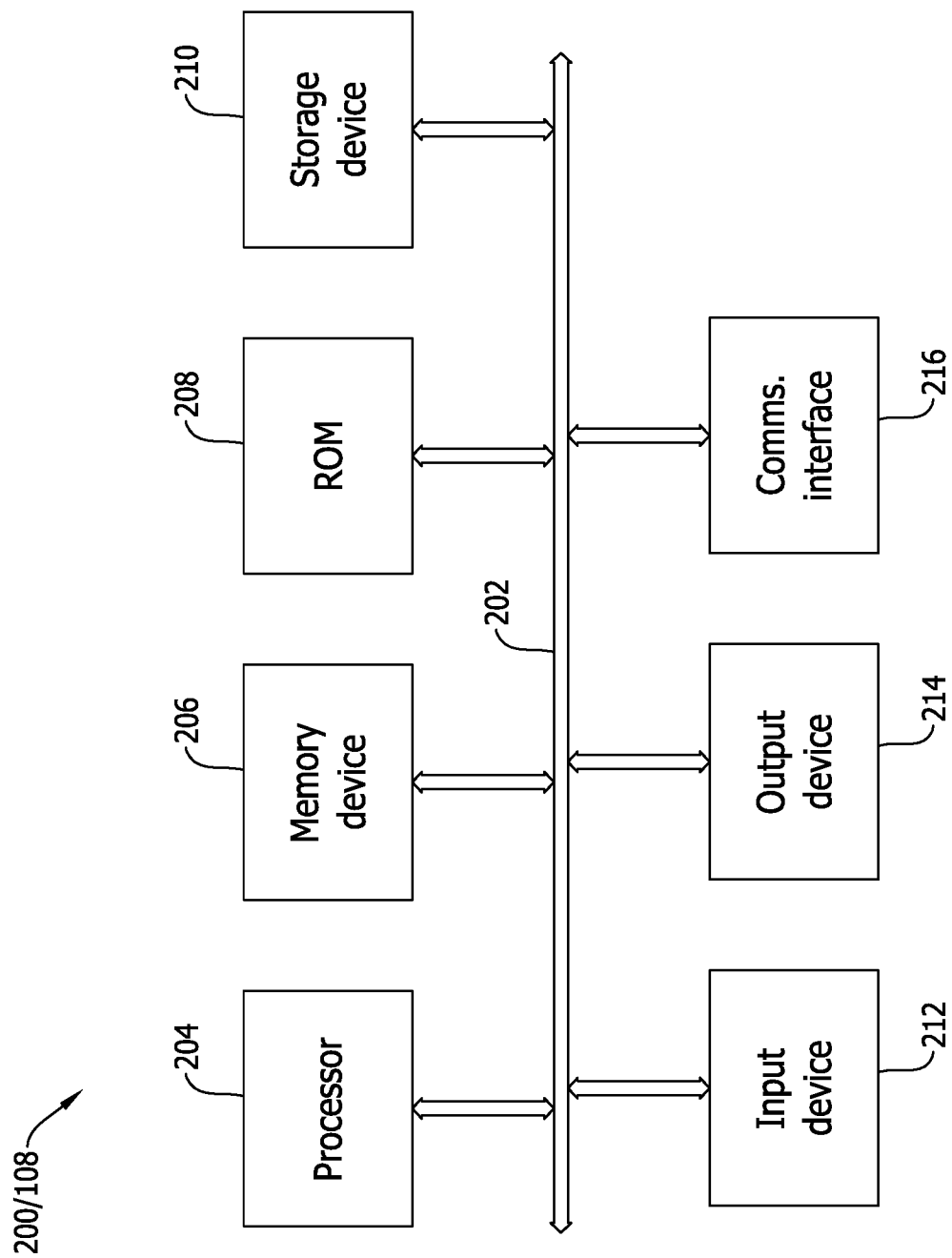
FIG. 2 is a block diagram of an example controller that may that may control operation of the deployable airborne radio antenna system.

FIG. 2 is a block diagram of an example controller 200 that may controls operation of aerial deployed radio antenna system 100. In the exemplary implementation, controller 200 is similar to controller 108 (shown in FIG. 1). Controller 200 may include a bus 202, a processor 204, a main memory 206, a read only memory (ROM) 208, a storage device 210, an input device 212, an output device 214, and a communication interface 216. Bus 202 may include a path that permits communication among the components of controller 200.

Processor 204 may include any type of conventional processor, microprocessor, or processing logic that interprets and executes instructions. Main memory 206 may include a random access memory (RAM) or another type of dynamic storage device that stores information and instructions for execution by processor 204. ROM 208 may include a conventional ROM device or another type of static storage device that stores static information and instructions for use by processor 204. Storage device 210 may include a magnetic and/or optical recording medium and its corresponding drive. In some implementations, storage device 210 includes wind data received from one or more secondary aerial vehicles 104.

Input device 212 may include a conventional mechanism that permits controller 200 to receive commands, instructions, or other inputs from a user, including visual, audio, touch, button presses, stylus taps, etc. Additionally, input device may receive location information. Accordingly, input device 212 may include, for example, a camera, a microphone, one or more buttons, a mouse, and/or a touch screen. Output device 214 may include a conventional mechanism that outputs information to a user, including a display (including a touch screen) and/or a speaker. Communication interface 216 may include any transceiver-like mechanism that enables controller 200 to communicate with other devices and/or systems. For example, communication interface 216 may include mechanisms for communicating with one or more secondary aerial vehicles 104, radar transmitter/receiver 118, and/or another computing device.

Figure 3:
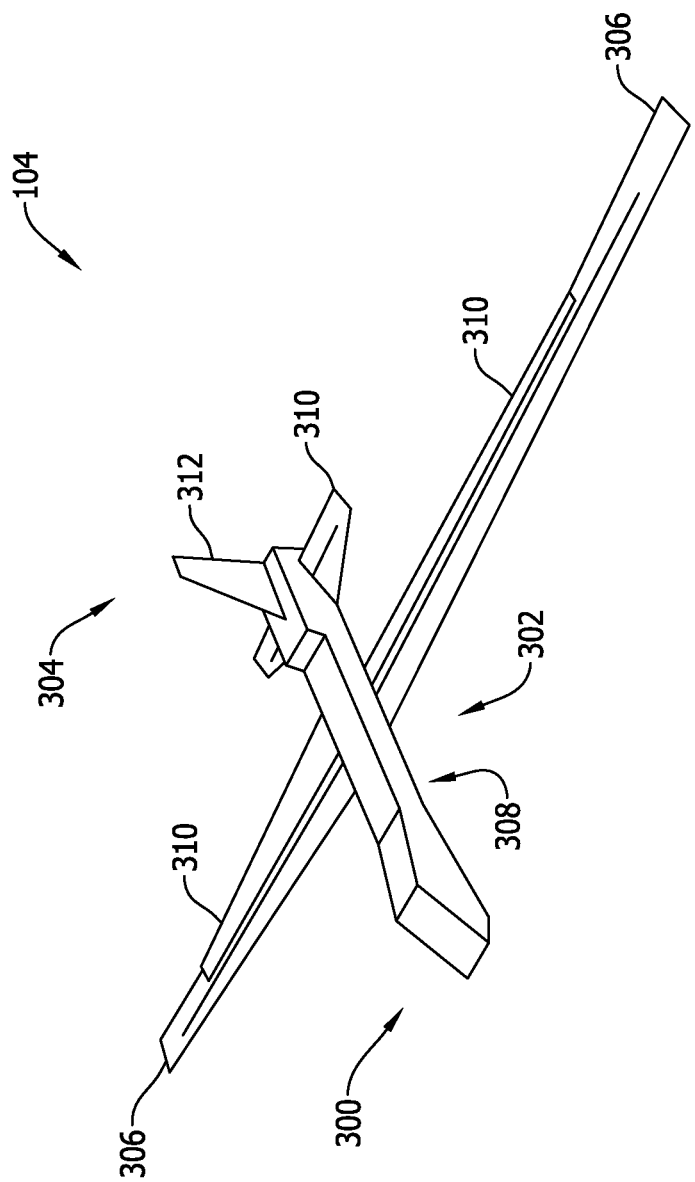
FIG. 3 is an illustration of an exemplary implementation of a secondary aerial vehicle shown in FIG. 1.

As described herein, controller 200 facilitates generating information of the target area based on the radar data received from radar transmitter/receiver 118. Controller 200 may perform these and other operations in response to processor 204 executing software instructions contained in a computer-readable medium, such as main memory 206. A computer-readable medium may be defined as a physical or logical memory device and/or carrier wave. The software instructions may be read into main memory 206 from another computer-readable medium, such as storage device 210, or from another device via communication interface 216. The software instructions contained in main memory 206 may cause processor 204 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software.

FIG. 3 is an illustration of an exemplary implementation of secondary aerial vehicles 104 (shown in FIG. 1). In the exemplary implementation, secondary aerial vehicles 104 are unmanned aerial vehicles (UAV); however, secondary aerial vehicles 104 may be any type of airborne vehicle that enables aerial deployed radio antenna system 100 to function as described herein. Each secondary aerial vehicle 104 includes a nose portion 300, a body portion 302, a tail portion 304, and wings 306 coupled to body portion 302. Furthermore, a plurality of secondary tethers 107 couple each secondary aerial vehicle 104 to at least one additional secondary aerial vehicle 104 such that a deployed position of each secondary aerial vehicle 104 is predetermined based on the length of secondary tethers 107, as described herein.

Additionally, each secondary aerial vehicle 104 includes a plurality of control surfaces (elevator 310 and rudder 312) that guide each secondary aerial vehicle 104 to a predetermined orientation/position/location relative to the other secondary aerial vehicles 104 such that the plurality of secondary aerial vehicles 104 expand to a 3-dimensional shape that supports radar-reflective sheet 114 in a parabolic reflector shape.

More specifically, each of wings 306 and/or tail portion 304 includes an elevator 310 that facilitates adjusting vertical lift of secondary airborne vehicle 104. For example, positioning elevator 310 horizontally would cause secondary airborne vehicle 104 to fly substantially directly behind primary aerial vehicle 102. Biasing elevator 310 downward relative to a horizontal axis would generate lift on secondary aerial vehicles 104, causing them to fly at a higher elevation than primary aerial vehicle 102. Biasing elevator 310 upward relative to the horizontal axis would generate a downward force on secondary aerial vehicles 104, causing them to fly at a lower elevation than primary aerial vehicle 102. The angle of elevators 310 of the plurality secondary aerial vehicles 104 may be biased at different angles relative to the horizontal axis so that secondary aerial vehicles 104 form radar-reflective sheet 114 into a predetermined generally parabolic shape when deployed and towed behind primary aerial vehicle 102.

Similarly, tail portion 304 includes a rudder 312 that facilitates adjusting horizontal lift of secondary aerial vehicles 104. For example, biasing rudder 312 straight behind secondary aerial vehicles 104 relative to direction of flight would cause secondary aerial vehicles 104 to fly substantially directly behind primary aerial vehicle 102. From the perspective of secondary aerial vehicles 104 looking towards primary aerial vehicle 102, biasing rudder 312 towards the left relative to a vertical axis would generate lift causing secondary aerial vehicles 104 to fly to the right of primary aerial vehicle 102. Alternatively, biasing rudder 312 towards the right relative to the vertical axis would generate lift causing secondary aerial vehicles 104 to fly to the left of primary aerial vehicle 102. The angles of elevators 310 of the plurality of secondary aerial vehicles 104 may be biased at different angles relative to the vertical axis so that secondary aerial vehicles 104 form radar-reflective sheet 114 into a predetermined generally parabolic shape when deployed and towed behind primary aerial vehicle 102.

In an alternative implementation, secondary aerial vehicles 104 include a propulsion system (not shown) configured to provide thrust to control flight of secondary aerial vehicles 104. The propulsion system may be any type of propulsion system known in the art for providing thrust on an airborne vehicle.

Referring to FIGS. 1 and 4, in operation, each secondary aerial vehicle 104 is designed to have different lift characteristics such that, when deployed from primary aerial vehicle 102, secondary aerial vehicles 104 pull away from each other and glide to a predetermined orientation/position/location relative to the other secondary aerial vehicles 104 such that the plurality of secondary aerial vehicles 104 expand to a 3-dimensional shape that supports radar-reflective sheet 114 in a parabolic reflector shape. Furthermore, the plurality of secondary tethers 107 limit the movement of each secondary aerial vehicle 104 relative to those to which it is coupled. As shown in FIG. 1, in the deployed position, cables 116 are coupled to radar-reflective sheet 114 at predetermined locations such that when secondary aerial vehicles 104 reach their desired locations, cables 116, attached to secondary aerial vehicles 104, form radar-reflective sheet 114 into the desired parabolic shape.

In the exemplary embodiment, aerial deployed radio antenna system 100 also includes a plurality of solar cells 126 disposed on at least an exterior of radar-reflective sheet 114 and a power collector 128 electrically coupled to solar cells 126 such that power collector 128 is configured to supply solar-generated electrical power to radar transmitter/receiver 118. Specifically, radar transmitter/receiver 118 is electrically powered solely by the plurality of solar cells 126 and does not receive electrical power generated by primary aerial vehicle 102. More specifically, in the exemplary embodiment, power collector 128 is located on primary aerial vehicle 102 and stores solely solar-generated power received from the plurality of solar cells 126. In one embodiment, solar cells 126 directly supply radar transmitter/receiver 118 with solar-generated electrical power and supply power collector 128 with solar-generated electrical power when radar transmitter/receiver 118 is not in operation or when solar cells 126 generate more electrical power than needed by radar transmitter/receiver 118. In some embodiments, radar transmitter/receiver 118 requires more electrical power than solar cells 126 alone can provide such that radar transmitter/receiver 118 receives electrical power from both power collector 128 and solar cells 126 simultaneously.

In one embodiment, radar-reflective sheet 114 has a surface area of at least 600 square meters and forms a hemisphere diameter of at least 20 meters, and the plurality of solar cells 126 generate at least 12 kilowatts of power. In such a configuration, radar transmitter/receiver 118 operates over approximately a 3 Gigahertz bandwidth, and the radar-reflective sheet 114 enables radar imaging resolution of about 10 centimeters at a distance of at least 560 kilometers.

In another embodiment, radar-reflective sheet 114 has a surface area of at least 10000 square meters and forms a hemisphere diameter of at least 80 meters, and the plurality of solar cells 126 generate at least 200 kilowatts of power. In such a configuration, radar transmitter/receiver 118 operates over approximately a 3 Gigahertz bandwidth, and radar-reflective sheet 114 enables radar imaging resolution of about 10 centimeters at a distance of at least 3760 kilometers. Generally, the larger the radar-reflective sheet 114, the greater the radar return, meaning larger radar-reflective sheets 114 are more sensitive to fainter radar signals. Additionally, the combination of a large area radar-reflective sheet 114 and being at an elevated altitude allows aerial deployed radio antenna system 100 to accurately image targets that are farther away than conventional radar systems.

In the exemplary embodiment, power collector 128 also supplies solar-generated electrical power to primary aerial vehicle 102. Radar transmitter/receiver 118 generally operates using a series of quick pulses of power. The excess power generated by solar cells 126 is supplied to primary aerial vehicle 102 via a conductor 109 on primary tether 106. More specifically, primary tether 106, secondary tethers 107, and cables 116 are conductive to enable transfer of solar-generated energy therethrough to at least one of power collector 128, radar transmitter/receiver 118, and primary aerial vehicle 102. In the exemplary embodiment, primary aerial vehicle 102 uses the electrical energy from power collector 128 to power onboard systems, such as, image processing computers and/or wireless communications. Furthermore, in the exemplary embodiment, primary aerial vehicle 102 is an electric unmanned aerial vehicle that operates on electrical power such that power collector 128 provides primary aerial vehicle 102 with electrical power. More specifically, plurality of solar cells 126 supply, via conductor 109 on primary tether 106 to power collector 128 on primary aerial vehicle 102, an effective amount of solar-generated electrical power that is sufficient to power primary aerial vehicle 102 for sustained persistent flight operation over relatively long distance, for example, at least 40 kilometers. In another embodiment, solar cells 126 supply solar-generated power directly to primary aerial vehicle 102 without being channeled through power collector 128. As described herein, radar transmitter/receiver 118 requires relatively little energy compared to the amount generated by solar cells 126. The excess electrical energy is provided to primary aerial vehicle 102 directly and power collector 128 or only to power collector for use by primary aerial vehicle 102 and by radar transmitter/receiver 118 when required.

The electrical power provided by solar cells 126 and/or power collector 128 enable primary aerial vehicle 102 to be deployed into a contested or restricted area where aircraft would not normally be sent and extend the range for radar imaging beyond conventional imaging equipment. As such, the combination of solar cells 126 on radar-reflective sheet 114 and power collector paired with an electric powered UAV primary aerial vehicle 102 enable aerial deployed radio antenna system 100 to be used in a contested or restricted area, that may be beyond the operational range of convention imaging equipment, for an extended duration without risking pilot and crew safety.

In the exemplary embodiment, controller 108 is electrically coupled to radar transmitter/receiver 118, power collector 128, and to primary aerial vehicle 102 and is configured to selectively transfer generated solar power from radar-reflective sheet 114 to radar transmitter/receiver 118 during radar operation and to alternately switch the generated solar power to power collector 128 during radar non-operation. Additionally, when radar transmitter/receiver 118 requires an amount of power greater than can be provided by solar cells 126 of radar-reflective sheet 114 alone, controller 108 controls power collector 128 to simultaneously provide power to radar transmitter/receiver 118. Furthermore, controller 108 is also configured to transfer stored electrical power from power collector 128 to primary aerial vehicle 102 to facilitate sustained persistent flight operations of primary aerial vehicle 102 and aerial deployed radio antenna system 100.

In operation, primary aerial vehicle 102 is initiated via communications interface 216 and directed to a predetermined target. Controller 108 instructs the tether management system (not shown) to begin deployment of secondary aerial vehicles 104 and radar-reflective sheet 114 with radar transmitter/receiver 118. Deployment is assisted by the airstream. As described herein, secondary aerial vehicles 104 glide to their predetermined positioned relative to each other to facilitate positioning radar-reflective sheet 114 into a parabolic reflector shape with radar transmitter/receiver 118 at or near its focus. Once primary aerial vehicle 102 has navigated to the target, controller 108 controls radar transmitter/receiver 118 to request initiation of a radar transmission of the desired target. Controller 108 determines if the radar transmission with require more power than can be supplied by solar cells 126 alone and, if so, provides additional power to radar transmitter/receiver 118 from power collector 128. Once the imaging is complete, radar transmitter/receiver 118 transmits the imaging data to controller 108 for storage and/or communication to a control station. In one embodiment, the tether management system then retracts primary and secondary tethers 106 and 107, secondary aerial vehicles 104, radar-reflective sheet 114, and radar transmitter/receiver 118 back into primary aerial vehicle 102 for storage. In another embodiment, primary tether 106 is released from primary aerial vehicle 102 and secondary aerial vehicles 104, radar-reflective sheet 114, and radar transmitter/receiver 118 are retrieved later by a ship or ground unit.

Figure 4A:
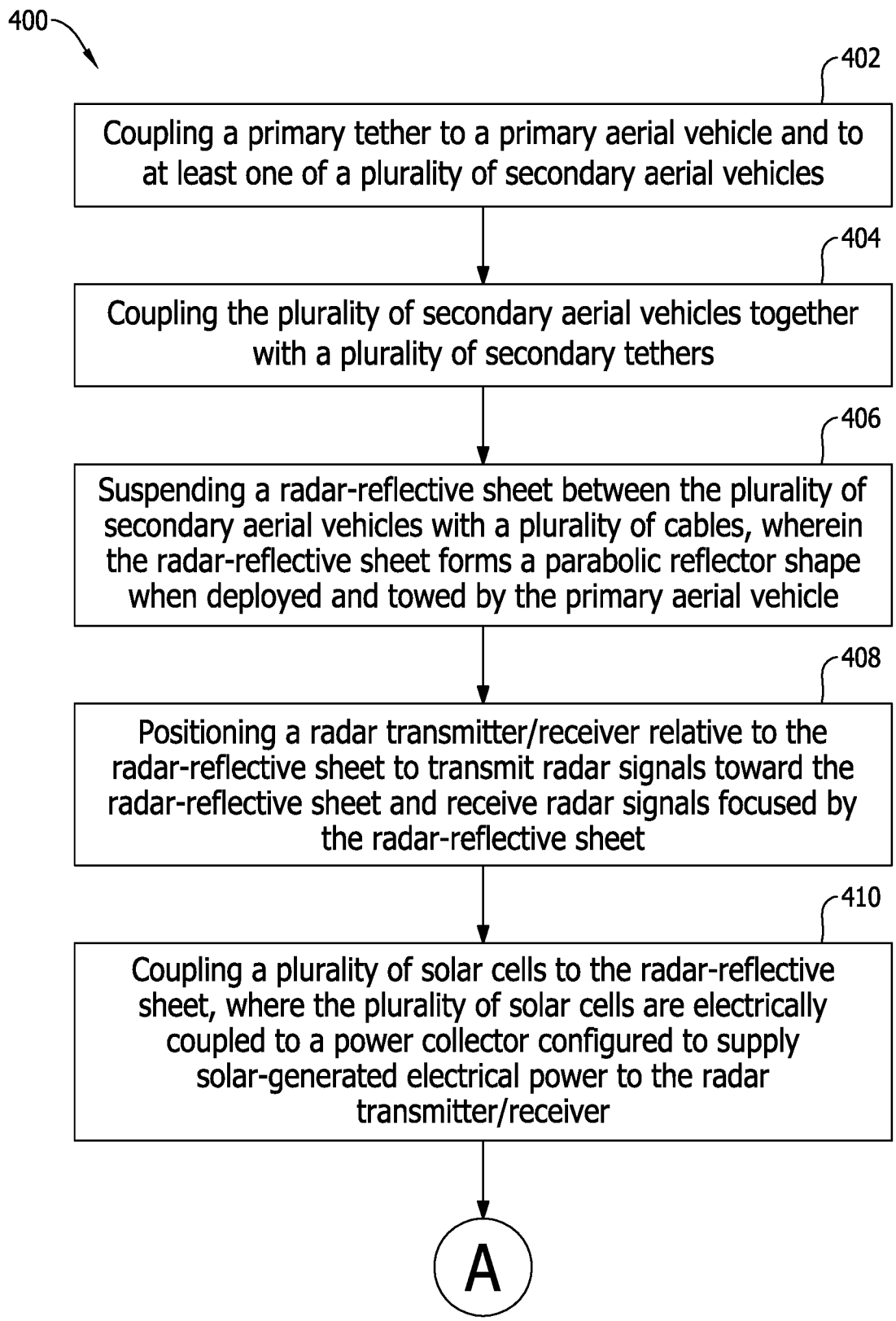
FIGS. 4A and 4B illustrate a flow chart of a method of assembling the deployable airborne radio antenna system shown in FIG. 1.
Figure 4B:
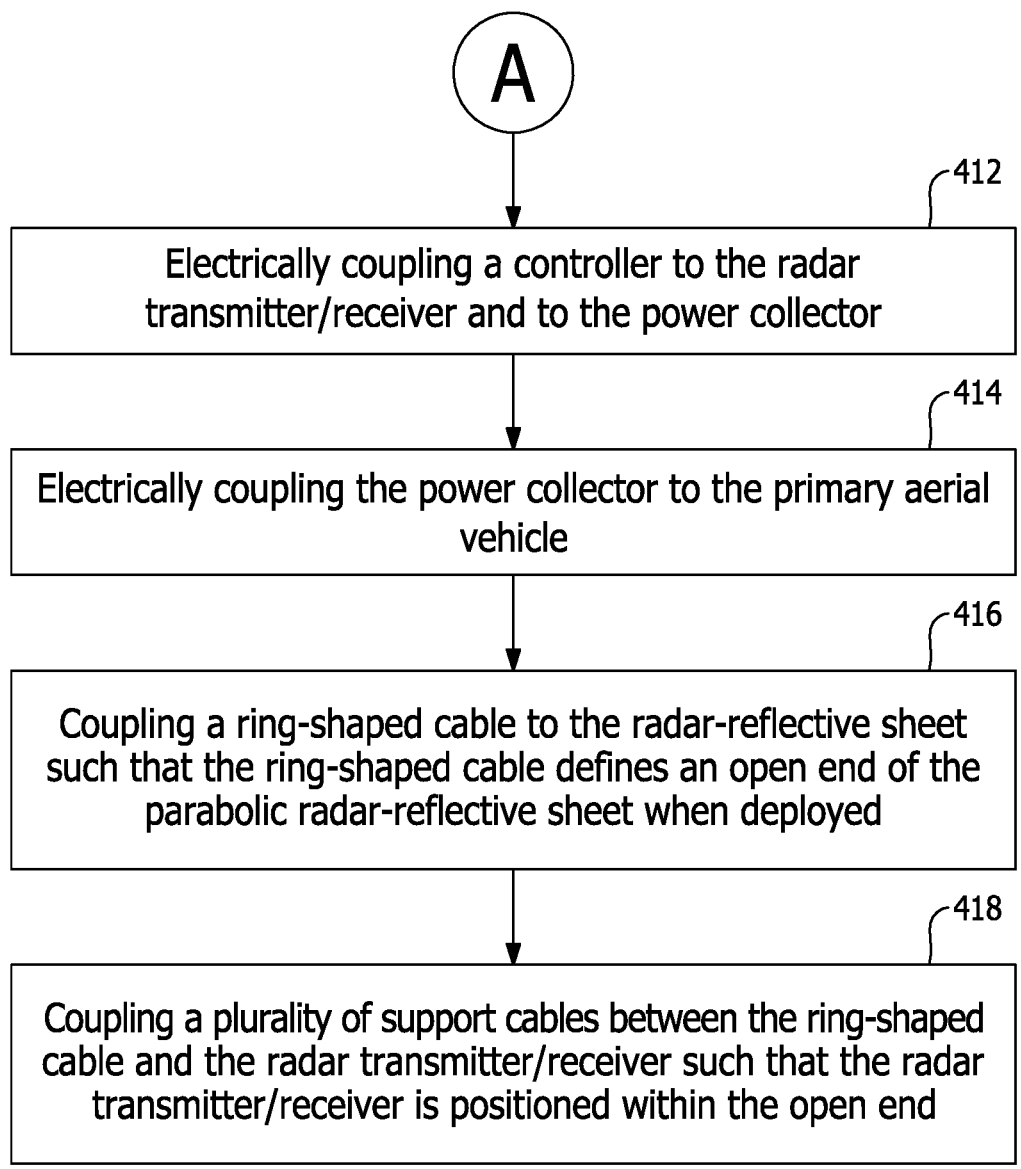

FIGS. 4A and 4B illustrate a flow chart of a method 400 of assembling the aerial deployed radio antenna system 100 shown in FIG. 1. Method 400 includes coupling 402 the primary tether 106 to primary aerial vehicle 102 and to at least one of the plurality of secondary aerial vehicles 104. Additionally, method 400 includes coupling 404 the plurality of secondary aerial vehicles 104 together with a plurality of secondary tethers 107. Radar-reflective sheet 114 is suspended 406 between the plurality of secondary aerial vehicles 104 with a plurality of cables 116 such that the radar-reflective sheet forms a parabolic reflector shape when deployed and towed by primary aerial vehicle 102. Method 400 also includes positioning 408 the radar transmitter/receiver 118 relative to the radar-reflective sheet 114 to transmit radar signals toward the radar-reflective sheet 114 and receive radar signals focused by the radar-reflective sheet 114. The plurality of solar cells 126 are coupled 410 to the radar-reflective sheet 114 and electrically coupled to power collector 128, which is configured to supply solar-generated electrical power to the radar transmitter/receiver 118.

As described herein, controller 108 is electrically coupled 412 to the radar transmitter/receiver 118 and to the power collector 128 such that the controller 108 is configured to selectively transfer a generated solar power from the radar-reflective sheet 114 to the radar transmitter/receiver 118 during radar operation and to alternately switch the generated solar power to the power collector 128 during radar non-operation. More specifically, controller 108 is electrically coupled to the radar transmitter/receiver 118 and to the power collector 128 such that the radar transmitter/receiver 118 selectively receives electrical power from the radar-reflective sheet 114 and the power collector 128 simultaneously.

Furthermore, the power collector 128 is electrically coupled 414 to the primary aerial vehicle 102 such that the controller 108 is configured to transfer stored electrical power from the power collector 128 to the primary aerial vehicle 102 to enable sustained persistent flight In the exemplary embodiment, method 400 also includes coupling 416 the ring-shaped cable 120 to the radar-reflective sheet 114 such that ring-shaped cable 120 defines open end 122 of the parabolic radar-reflective sheet 114 when deployed. Additionally, the plurality of support cables 124 are coupled 418 between the ring-shaped cable 120 and the radar transmitter/receiver 118 such that the radar transmitter/receiver 118 is positioned within the open end 122.

Example technical effects of the methods, systems, and apparatus described herein include at least one of: (a) supplying solar-generated electrical power collected by solar cells on a radar-reflective sheet to radar imaging equipment and to a towing vehicle; (b) improving the range and sensitivity of the radar imaging equipment by operating the radar imaging equipment at comparatively higher power levels enabled by cooling the radar imaging equipment with the passing airstream; (c) improving the range and sensitivity of the radar imaging equipment using a larger than conventional radar reflective sheet enabled by towing the sheet at a high altitude; (d) deploying the radar imaging equipment into contested areas and/or for long durations enabled by sustained persistent flight of the towing vehicle powered by solar cells.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used.

Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the embodiments described herein, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A aerial deployed radio antenna system comprising:
   a primary aerial vehicle;
   a plurality of secondary aerial vehicles coupled to the primary aerial vehicle with a primary tether, wherein the plurality of secondary aerial vehicles are coupled to each other with a plurality of secondary tethers;
   a radar-reflective sheet suspended between and supported by a plurality of cables coupled to the plurality of secondary aerial vehicles, wherein the radar-reflective sheet forms a parabolic reflector shape when deployed and towed by the primary aerial vehicle,
   a radar transmitter/receiver, positioned relative to the radar-reflective sheet to transmit radar signals toward the radar-reflective sheet and receive radar signals focused by the radar-reflective sheet; and
   a plurality of solar cells disposed on the radar-reflective sheet, where the plurality of solar cells are electrically coupled to a power collector configured to supply solar-generated electrical power to the radar transmitter/receiver.

2. The system of claim 1, wherein each secondary aerial vehicle comprises a plurality of control surfaces that guide each secondary aerial vehicle to a predetermined orientation/position/location relative to the other secondary aerial vehicles such that the plurality of secondary aerial vehicles expand to a 3-dimensional shape that supports the radar-reflective sheet in a parabolic reflector shape.

3. The system of claim 1, wherein the radar transmitter/receiver is electrically powered solely by the plurality of solar cells, and does not receive electrical power generated by the primary aerial vehicle.

4. The system of claim 1, wherein the radar-reflective sheet has a surface area of at least 600 square meters and forms a hemisphere diameter of at least 20 meters, and wherein the plurality of solar cells generate at least 12 kilowatts of power.

5. The system of claim 4, wherein the radar transmitter/receiver operates over approximately a 3 Gigahertz bandwidth, and the radar-reflective sheet enables radar imaging resolution of about 10 centimeters at a distance of at least 560 kilometers.

6. The system of claim 1, wherein the radar-reflective sheet has a surface area of at least 10000 square meters and forms a hemisphere diameter of at least 80 meters, and where the plurality of solar cells generate at least 200 kilowatts of power.

7. The system of claim 6, wherein the radar transmitter/receiver operates over approximately a 3 Gigahertz bandwidth, and the radar-reflective sheet enables radar imaging resolution of about 10 centimeters at a distance of at least 3760 kilometers.

8. The system of claim 1, wherein the plurality of solar cells supply, via a conductor on the primary tether to the primary aerial vehicle, an effective amount of solar-generated electrical power that is sufficient to power the primary aerial vehicle for sustained persistent flight operation over distances of at least 40 kilometers.

9. The system of claim 1, further comprising a controller electrically coupled to the radar transmitter/receiver and to the power collector, wherein the controller is configured to selectively transfer a generated solar power from the radar-reflective sheet to the radar transmitter/receiver during radar operation and to alternately switch the generated solar power to the power collector during radar non-operation.

10. The system of claim 9, wherein the radar transmitter/receiver receives electrical power from the radar-reflective sheet and the power collector simultaneously.

11. The system of claim 9, wherein the controller is configured to transfer stored electrical power from the power collector to the primary aerial vehicle.

12. The system of claim 1, wherein the power collector receives electrical power solely from the plurality of solar cells.

13. The system of claim 1, wherein the radar-reflective sheet comprises a ring-shaped cable that defines an open end of the radar-reflective sheet when deployed.

14. The system of claim 13, further comprises a plurality of support cables coupled between the ring-shaped cable and the radar transmitter/receiver such that the radar transmitter/receiver is positioned within the open end.

15. The system of claim 1, wherein the primary tether and the plurality of secondary tethers are conductive to enable transfer of solar generated energy therethrough to at least one of the power collector, the radar transmitter/receiver, and the primary aerial vehicle.

16. A method of assembling an aerial deployed radio antenna system, the method comprising:
coupling a primary tether to a primary aerial vehicle and to at least one of a plurality of secondary aerial vehicles;
coupling the plurality of secondary aerial vehicles together with a plurality of secondary tethers;
suspending a radar-reflective sheet between the plurality of secondary aerial vehicles with a plurality of cables, wherein the radar-reflective sheet forms a parabolic reflector shape when deployed and towed by the primary aerial vehicle;
positioning a radar transmitter/receiver relative to the radar-reflective sheet to transmit radar signals toward the radar-reflective sheet and receive radar signals focused by the radar-reflective sheet; and
coupling a plurality of solar cells to the radar-reflective sheet, where the plurality of solar cells are electrically coupled to a power collector configured to supply solar-generated electrical power to the radar transmitter/receiver.

17. The method of claim 16, further comprising electrically coupling a controller to the radar transmitter/receiver and to the power collector, wherein the controller is configured to selectively transfer a generated solar power from the radar-reflective sheet to the radar transmitter/receiver during radar operation and to alternately switch the generated solar power to the power collector during radar non-operation.

18. The method of claim 17, wherein electrically coupling the controller comprises electrically coupling the controller to the radar transmitter/receiver and to the power collector such that the radar transmitter/receiver selectively receives electrical power from the radar-reflective sheet and the power collector simultaneously.

19. The method of claim 17, further comprising electrically coupling the power collector to the primary aerial vehicle, wherein the controller is configured to transfer stored electrical power from the power collector to the primary aerial vehicle.

20. The method of claim 16, further comprising:
coupling a ring-shaped cable to the radar-reflective sheet such that the ring-shaped cable defines an open end of the radar-reflective sheet when deployed; and
coupling a plurality of support cables between the ring-shaped cable and the radar transmitter/receiver such that the radar transmitter/receiver is positioned within the open end.

* * * * *